United States Patent [19]

Mizusaki

[11] 4,437,091
[45] Mar. 13, 1984

[54] FLUID-QUANTITY ALARMING DEVICES FOR THE MASTER CYLINDER

[75] Inventor: Yoshinobu Mizusaki, Ueda, Japan

[73] Assignee: Nissin Kogyo Co., Ltd., Ueda, Japan

[21] Appl. No.: 266,224

[22] Filed: May 22, 1981

[30] Foreign Application Priority Data

Jul. 24, 1980 [JP] Japan .................. 55-104976

[51] Int. Cl.³ .............................. G08B 21/00
[52] U.S. Cl. ............................ 340/623; 340/59
[58] Field of Search ............ 340/623, 624, 59; 200/84 C; 73/305, 306, 307, 308, 313

[56] References Cited

U.S. PATENT DOCUMENTS

| | | | |
|---|---|---|---|
| 3,319,240 | 5/1967 | Mirarchi et al. | 340/624 |
| 3,603,925 | 9/1971 | Hughes et al. | 340/623 |
| 3,603,926 | 9/1971 | Kimura | 340/624 |
| 3,611,285 | 10/1971 | Eggstein | 340/624 |
| 3,680,044 | 7/1972 | Tsubouchi | 340/59 |
| 3,849,770 | 11/1974 | Hayashida | 340/59 |
| 4,301,440 | 11/1981 | Kubota et al. | 340/59 |

Primary Examiner—Gerald L. Brigance
Attorney, Agent, or Firm—Jordan and Hamburg

[57] ABSTRACT

A fluid-quantity alarming system for a brake cylinder comprises a brake master cylinder body, a reservoir disposed on and connected to the cylinder body to be biased relative to the central axis of the master cylinder, the reservoir including an opening in a plane passing through the central axis of the master cylinder for fluid communication between the master cylinder body and the reservoir, an attachment hole located adjacent to the corner thereof away from the central axis of the master cylinder, and at least one blind female screw adjacent to the attachment hole, a switch case including a switch therein with a lead extending from the switch, a flange attached to the lower part of the switch case with a hole therein and a screw, and a float disposed around the switch case to be vertically moved in accordance with liquid level in the reservoir. The float includes means to actuate the switch when the float is located beside the switch. The switch case is disposed in the reservoir such that a lower end is sealingly situated in the attachment hole to permit the load attached to the switch to extend outside the reservoir, and the screw is disposed to pass through the hole of the flange and is fastened with the blind female screw.

5 Claims, 6 Drawing Figures

FLUID-QUANTITY ALARMING DEVICES FOR THE MASTER CYLINDER

BACKGROUND OF THE INVENTION

1. Field of the Invention

The present invention relates to fluid-quantity alarming devices for a master cylinder. The master cylinder should be designed so that the quantity of brake fluid within a reservoir may be checked. For this reason, the inside of the reservoir is made visible from outside or the reservoir has a fluid-quantity sensor therein.

2. Description of the Prior Art

A motorbike is generally provided with a fluid-quantity alarming device since a reservoir made of transparent resin, which is mechanically weak, is unsuitable in view of possible damage caused by falling of the bike and because the bike has restricted positions for attaching the reservoir.

If the fluid-quantity alarming device is not firmly attached to the reservoir, it will cause a leak of brake fluid or an erroneous functioning will be caused by disengagement or inclination of the alarming device due to vibrations.

In general, the reservoir is designed so as to be placed on the center line of the master cylinder body. Thus, when the reservoir is of small size, a float of the fluid-quantity alarming device is to be positioned above a fluid-supply hole communicating the master cylinder body with the reservoir, which may cause erroneous function under the influence of the gushing of the brake fluid from the supply hole.

SUMMARY OF THE INVENTION

The purpose of the present invention is to eliminate the above-mentioned defects. The fluid-quantity alarming device for the master cylinder of the invention can be firmly and sealingly attached to the ideal position within the reservoir, which is characterized in that, the reservoir is biasedly disposed with respect to the axis-line of the master cylinder body connected to brake lever set on the handle of the motorbike; that a set of a switch case and a float is provided within the reservoir; that the switch case has its flange section extended in contact with the reservoir bottom; that the reservoir bottom has a hole for withdrawing the lead wire of the switch case bored and a thick-walled section provided for a blind female screw; that the switch case is put on the hole and fixed by applying a screw from inside the reservoir through the above-mentioned extended flange onto the above-mentioned blind female screw; and that the float is applied onto the switch case so that its side planes are placed along the walls of the reservoir.

DETAILED DESCRIPTION OF THE INVENTION

Figure 1:
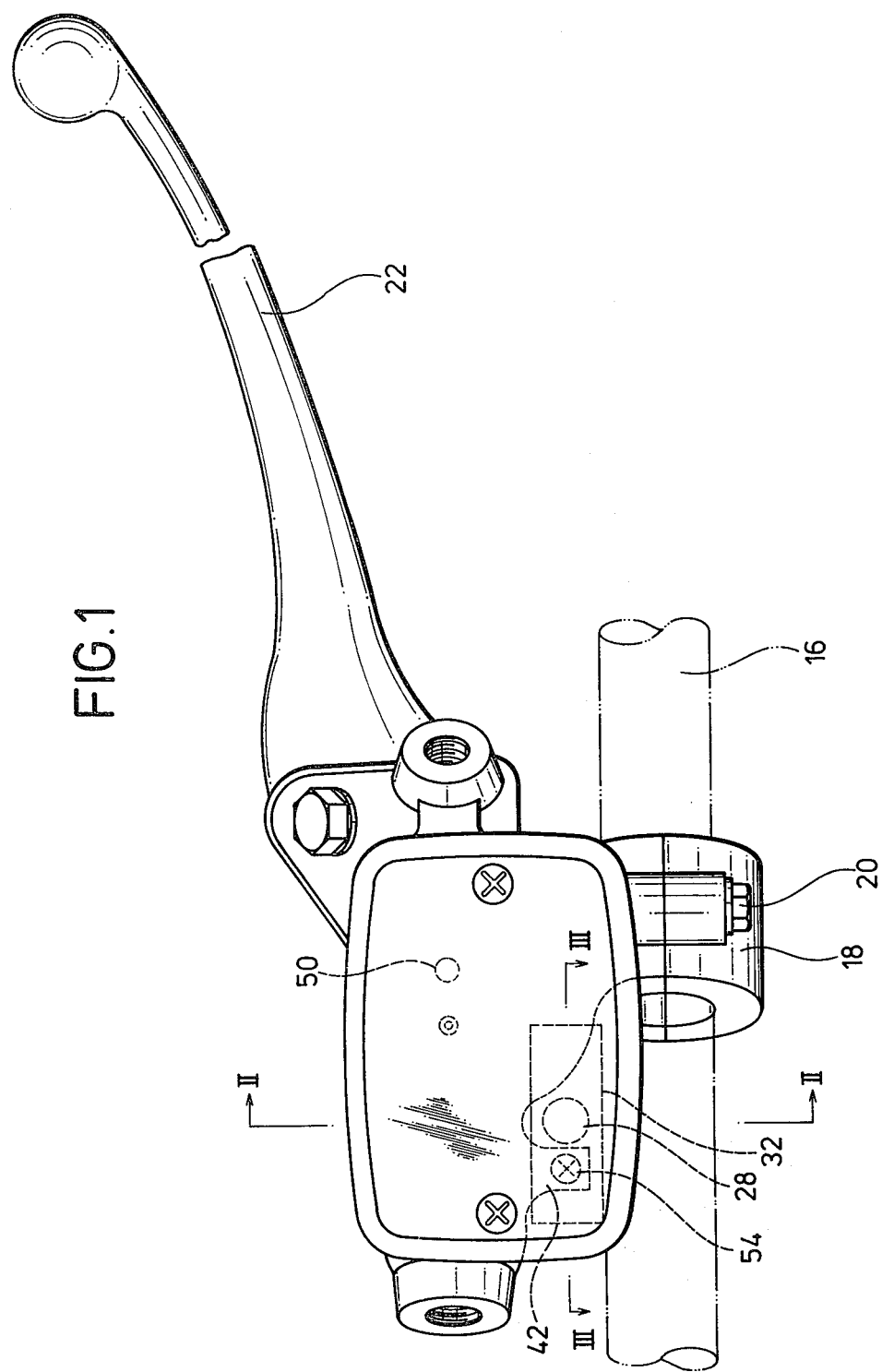
FIG. 1 shows a plan view of a master cylinder 10 for a motorbike.
Figure 2:
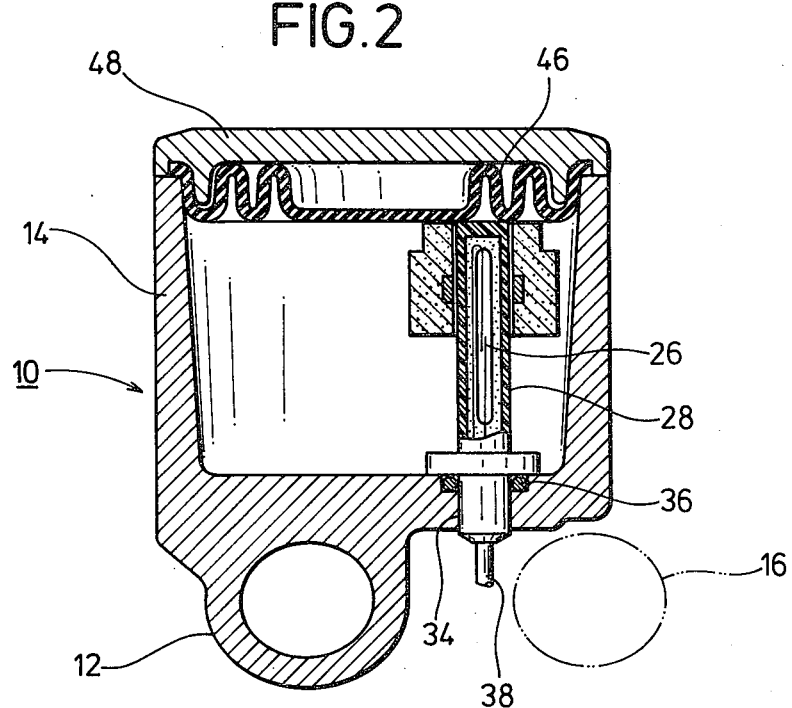
FIG. 2 shows a sectional view taken along line II—II in FIG. 1.
Figure 3:
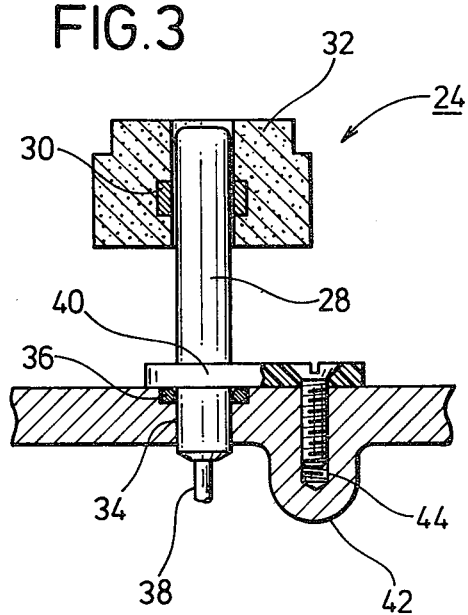
FIG. 3 shows a sectional view for the fluid-quantity alarming device taken along line III—III in FIG. 1.

Embodiments of the present invention are described below in detail with reference to the drawing appended.

10 is a master cylinder, mainly composed of a master cylinder body 12 and a reservoir 14 connected thereon.

16 is a handle lever, on which the master cylinder 10 is fixed by a bolt 20 by means of a holder 18.

The reservoir 14 is located to be biased toward a side of the handle lever 16 with respect to the axis line of the master cylinder body.

22 is a brake bar, which is connected to the master cylinder body 12 and directly operates the master cylinder.

24 is a fluid-quantity alarming device, in which a switch case 28 provided with a contact 26 is set vertically within a reservoir 14, and the float 32 provided with a magnet ring 30 is set outside the switch case 28 to move up and down as the fluid level changes, so that the contact 26 is operated for making an alarm at the lower limit of the fluid level.

The fluid-quantity alarm device 24 is set at the corner close to both the handle bar 16 and the center of the handle (not shown in the figure) in the reservoir 14.

For setting of the alarming device, a hole 34 is bored on the bottom of the reservoir 14, and the switch case 28 is set from the upper side of the hole so that an O-ring 36 is placed between the reservoir 14 and the switch case 28. A lead wire 38 for the contact 26 is drawn downwardly out of the hole. The lower part of the switch case 28 has a flange section 40 extended horizontally in one direction parallel to the cylinder axis, and the flange section has a hole for flush screw at the middle. On the bottom of the reservoir 14 a thick-walled section 42 is made in the direction perpendicular to the cylinder axis of the master cylinder body 12, the thick-walled section 42 having a blind female screw 44 inside the reservoir. A flush screw 54 is inserted into the hole for the flush screw in the extended flange section 40 of the switch case 28 and is screwed into the blind female screw 44, thereby firmly fixing the flange section 40 on the bottom of the reservoir 14.

The reservoir 14 is sealed by a cap 48 with a diaphragm 46.

The float 32 has two adjacent vertical planes positioned close and parallel to the respective side walls of the above-mentioned corner of the reservoir 14.

The present invention is constructed as described above. The switch case 28 is firmly attached to the bottom of the reservoir 14 at the extended flange section 40 by the flush screw 54, which is held in the blind female screw 44 provided at the thick-walled section 42 on the bottom of the reservoir 14, so that there appears no sealing problem by attaching the switch case 28 to the reservoir 14.

Since the reservoir 14 is located to be biased toward a side of the handle lever 16 with respect to the axis line of the master cylinder body 12, and the whole of the fluid-quantity alarming device 24 is set at the corner of the reservoir 14 away from the center line of the master cylinder body 12, the gushing of brake fluid from the supply hole 50 located on the center line of the master cylinder body 12 does not affect the float 32 to cause its malfunctioning. Further, the alarming device receives little influence from vibration since the side wall of the reservoir 14 keeps it from turning. In addition, the reservoir 14 has little chance to be damaged from the falling-down of the motorbike.

Another advantage is that, since the thick-walled section serving to fix the switch case 28 is located close to the master cylinder body 12, the section 42 may be reinforced by the master cylinder body 12.

Another advantage is that the lead wire 38 from the fluid-quantity alarming device 24 may be protected from mischief since it is located between the master cylinder body 12 and the handle bar 16.

Figure 4:
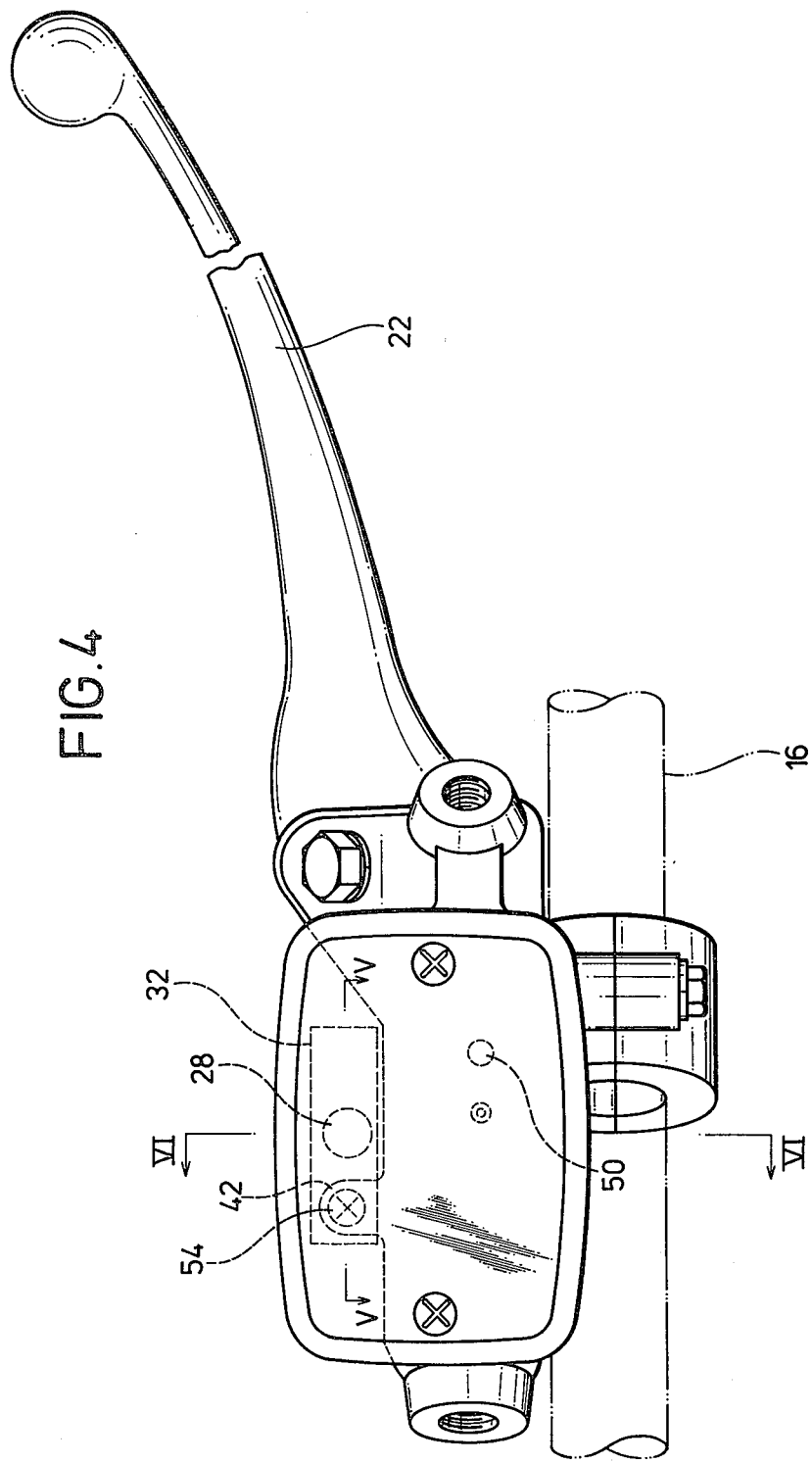
FIG. 4 is a plan view of another example of the present invention.
Figure 5:
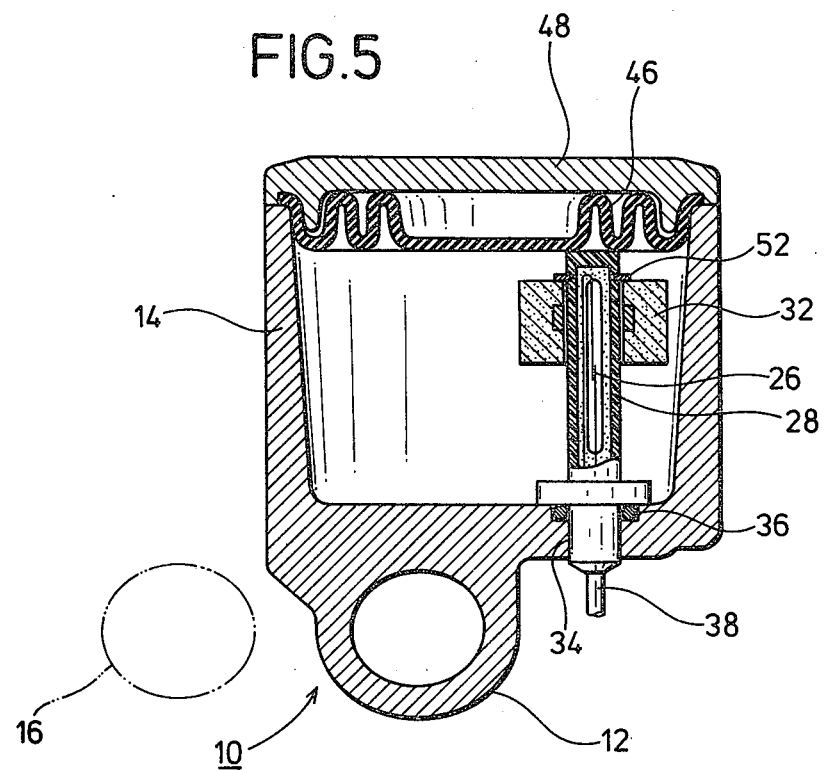
FIGS. 5 and 6 are section views taken along line V—V and VI—VI in FIG. 4 respectively.
Figure 6:
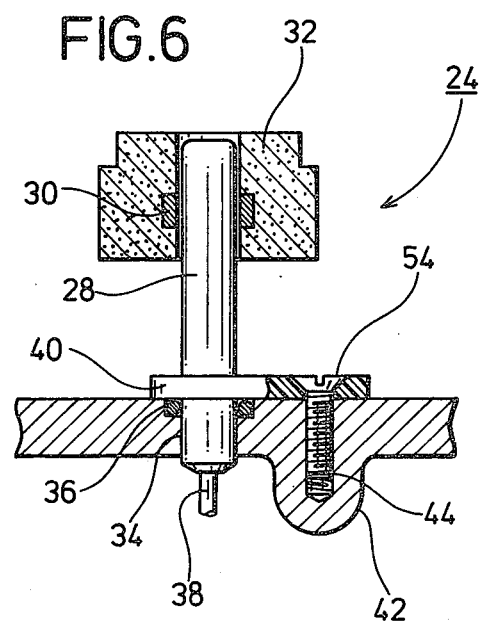

The present invention has been described in detail by using the suitable example. It goes without saying that the present invention is not restricted to this example but that a variety of modifications are applicable within the scope of the spirit of the invention. Namely, the reservoir 14 may be located to be biased toward the running direction of the motorbike with respect to the cylinder axis-line, the second embodiment being shown in FIGS. 4, 5, and 6. In FIG. 4, the reservoir 14 is located to be biased, with respect to the axis-line of the master cylinder body 12, in the upward direction in the drawing corresponding to the running direction of the motorbike. The float 32 is positioned at the upper center in the reservoir 14 in FIG. 4 so as not to be influenced by the gushing action of the brake fluid from the fluid-supply hole 50 while the master cylinder is working. The fluid-supply hole 50 through which the brake fluid gushes is located at the right lower part in the reservoir 14 and on the axis line of the master cylinder body 12. The float 32 is in the form of rectangle with its long edges being parallel to the side walls inside the reservoir 14, which serves to prevent the float from being shaken. In addition, the float 32 is set away from the fluid-supply hole 50, which reduces the effect of the brake-fluid gushing on the float, thereby resulting prevention of malfunctioning of the fluid-quantity alarming device. FIG. 5 illustrates an example in which an E-ring 52, as the upper stopper for the float 32, is set at the upper part of the switch case 28, serving to prevent the overmovement of the float upwardly due to the violent vibration of the motorbike.

The motorbike is characteristically provided with the master cylinder on the handle bar and accordingly the master cylinder is apt to be damaged by the motorbike falling-down and easy to be involved in mischief as compared with ordinary automobiles. In this respect and others, with the fluid-quantity alarming device for the master cylinder in the present invention, the reservoir is hard to be broken as compared with conventional plastic tanks since it may be molded sturdy in one unit with the cylinder by using aluminum alloy, etc. The built-in fluid-quantity alarming device is protected from malfunction under the influence of the gushing of brake fluid during the operation of the master cylinder and is firmly fixed by the application of the screw from inside the reservoir onto the blind female screw. The float is set away from the fluid-supply hole, and no external force is able to easily remove the fluid-quantity alarming device.

I claim:

1. A fluid-quantity alarming system for a brake cylinder comprising;
    a brake master cylinder body;
    a reservoir connected to said cylinder body, said reservoir being substantially in an elongated rectangular parallelepiped form and being disposed on said cylinder body so that the central axis of the reservoir in an elongated direction is biased relative to the central axis of the master cylinder, said reservoir including an opening at the bottom thereof in a plane passing through the central axis of the master cylinder body for fluid communication between the master cylinder body and the reservoir, an attachment hole located adjacent to a wall of the reservoir away from the central axis of the master cylinder and the opening, and at least one blind female screw adjacent to the attachment hole extending downwardly from the inside of the reservoir,
    a switch case including a switch therein with a lead extending from the switch, a flange attached to the lower part of the switch case with a hole therein, and a screw, said switch case being disposed in the reservoir such that a lower end is sealingly situated in the attachment hole to permit the lead attached to the switch to extend outside the reservoir, and the screw is disposed to pass through the hole of the flange and is fastened with the blind female screw, and
    a float disposed around the switch case to be vertically moved in accordance with liquid level in the reservoir, said float having such dimensions that it is not located above the opening so that the fluid passing through the opening does not affect the float, and means to actuate the switch when the float is located beside the switch.

2. A fluid-quantity alarming system according to claim 1, in which said float includes at least one side edge parallel to and adjacent to the wall of the reservoir at the opposite side of the central axis of the master cylinder body so that the float does not rotate relative to the switch case.

3. A fluid quantity alarming system according to claim 2, further comprising a cap for covering the reservoir, and a diaphragm situated between the reservoir and the cap for sealing the reservoir, said diaphragm serving as an upper stop for the float so that the float can be situated around the switch case.

4. A fluid-quantity alarming system adapted to be attached to a handle of a motorcycle according to claim 3, in which said reservoir is located to be biased toward the handle relative to the central axis of the master cylinder, so that the lead extending from the switch case can be maintained between the handle and the master cylinder.

5. In a fluid-quantity alarming system adapted to be attached to a handle of a motorcycle comprising a brake master cylinder body connected to the handle, a reservoir connected to the cylinder body and having an opening to be in fluid communication with the master cylinder body, and a switch device connected inside said reservoir and having a switch case, a switch inside the switch case having a lead, and a float with means to actuate the switch, said float movably situated around the switch case, the improvement comprising;
    said reservoir being integrally connected to the cylinder body so that the reservoir is biased relative to the central axis of the master cylinder body and the opening is located in a plane passing through the central axis of the master cylinder body, said reservoir including an attachment hole located adjacent to a wall of the reservoir away from the cylinder body and at least one blind female screw in a thick wall section adjacent to the attachment hole, said thick wall section extending integrally from the bottom of the reservoir to a side of the cylinder body so that the female screw extends downwardly from the inside of the reservoir for a predetermined length, said switch case of the switch device including a flange attached to the lower part thereof, a hole in the flange and a screw, said switch case being disposed in the reservoir such that a lower end of the switch case is sealingly situated in the attachment hole to permit the lead attached to the switch to extend outside the reservoir, and the screw being disposed to pass through the hole of the flange and being fastened with the blind female screw to fix the switch case in the reservoir, and said float including at least one side edge parallel to and adjacent to a wall of the reservoir at the opposite side of the central axis of the master body and said float being so dimensioned that the float is not located above the opening so that the float is not influenced by fluid flowing through the opening and does not rotate relative to the switch case.

* * * * *